3,219,651
PROCESS FOR THE POLYMERIZATION OF ETHYLENE IN THE PRESENCE OF A ZIEGLER-TYPE CATALYST AND AS A CATALYTIC MODIFIER A POLYDENTATE COMPOUND
Robert W. Hill, Leawood, and Robert L. Batchelor, Olathe, Kans., assignors, by mesne assignments, to Gulf Oil Corporation, Pittsburgh, Pa., a corporation of Pennsylvania
No Drawing. Filed Aug. 5, 1960, Ser. No. 47,620
22 Claims. (Cl. 260—94.9)

This application is a continuation-in-part of Serial No. 858,590, filed December 10, 1959, and now abandoned.

This invention relates to synthetic polymers. More particularly, this invention is concerned with novel catalyst compositions and processes of producing resinous polyethylene using the catalyst compositions.

It is known that Ziegler-type catalysts polymerize ethylene at low temperatures and pressures to form resinous polyethylene. By Ziegler-type catalyst is meant a catalyst formed by combining an organometallic compound in which the metal is from Groups IA, IIA, IIB and IIIA of the Periodic Table in Deming's "General Chemistry" (5th Ed.), John Wiley and Sons, which is reprinted in the "Handbook of Chemistry and Physics," 31st Ed. (1949), Chemical Rubber Publishing Co., p. 336, with a halide of a metal from Groups IVB, VB or VIB of the same Periodic Table.

Some of the metal halides used in producing a Ziegler-type catalyst are the chlorides and bromides of titanium, zirconium, vanadium, chromium, molybdenum and tungsten with the titanium and vanadium trichlorides and tribromides being preferred.

Particularly suitable organometallic compounds are the alkyl, and especially the lower alkyl, compounds of metals of Groups IA, IIA, IIB and IIIA of the Periodic Table, such as aluminum, zinc, cadmium, beryllium and lithium. Organometallic compounds in which the metal is attached to cycloalkyl radicals or aromatic radicals, as well as halogenated compounds such as the dialkyl aluminum chlorides, are also suitable.

Examples of suitable organometallics useful in forming the Ziegler-type catalyst are the dialkyl cadmiums such as diethylcadmium, dimethylcadmium and diisobutylcadmium, the dialkylzincs such as diethylzinc and dibutylzinc, the alkylaluminums such as triethylaluminum, triisobutylaluminum, diisobutylaluminum hydride and diethylaluminum chloride, the compounds butyllithium and diethylberyllium, and the aryl metal compounds such as diphenylcadmium, dinaphthylzinc and phenyllithium.

The Ziegler-type catalyst is conveniently produced by reacting the organometallic compound with the metallic halide in the presence of a hydrocarbon solvent such as isooctane, n-heptane or benzene. The molar ratio between the organometallic compound and the halogenated metal may be varied within wide limits. A ratio of about 0.25 to about 4 moles of halogenated compound, such as a titanium or vanadium trichloride, to 1 mole of the organometallic compound is suitable. A typical catalyst system could be composed of triisobutylaluminum and titanium trichloride combined in an equimolar ratio.

Polymerization of ethylene with a Ziegler-type catalyst is usually effected by contacting ethylene with the catalyst in the presence of an inert solvent such as benzene or a saturated hydrocarbon like isooctane, n-hexane, pentane, decane or cyclohexane. The reaction is generally effected at a temperature of about 0 to 200° C., preferably at 25 to 150° C., and at pressures of about atmospheric or slightly above.

According to the present invention it has been discovered that effecting the polymerization of ethylene with an additive modified Ziegler-type catalyst results in a significant increase in the polymerization rate and/or polymer linearity as evidenced by increased density and a minimum of chain branching, as well as control of the molecular weight of the polyethylene. These additive modified catalysts comprise the reaction product of an organometallo compound and a metal halide of a conventional Ziegler-type catalyst and a chelate forming polyamine or aminoether.

By "polyamine" is meant a compound containing at least two nitrogen atoms present as substituted or unsubstituted amine groups. By "aminoether" is meant a compound having both an amino nitrogen atom and an ether oxygen atom in the molecule. The aminoethers and polyamines which form chelates with metals are the preferred components since they give superior catalysts when chemically combined with the organometallo compound and metal halide.

Representative aminoethers that can be used include N-ethylmorpholine, 2-ethoxyethylamine, bis(2-ethoxyethyl)amine, N,N-diethylaminomethyl methyl ether and N,N-diethylaminoethyl methyl ether.

Representative polyamines that can be used include

N,N,N',N'-tetramethylethylenediamine,
N,N,N',N'-tetramethylmethylenediamine,
1,3-bis(dimethylamino)butane,
3-(diethylamino)propylamine,
N,N'-diethylethylenediamine,
N,N',N''-trimethyl diethylenetriamine,
$N_1$-phenyl-2-methyl-1,2-propanediamine,
2-(2-N-pyrrolidinoethyl)piperidine,
2-aminopyridine,
N,N,N'-trimethylethylenediamine,
N,N'-dibenzylethylenediamine,
1,3-bis(dimethylamino)propanol-2,
1-(dimethylamino)-4-aminopentane,
N,N'-diphenylethylenediamine,
alpha,alpha'-ethylenediimino-di(orthocresol),
N-(2-hydroxypropyl)-2-methyl-1,2-propanediamine,
N,N,N',N'-tetramethyl-1,3-butanediamine,
N,N,N',N'-tetramethyl-1,3-propanediamine,
2-(diallylamino)ethylamine,
N-benzyl-N,N'-dimethylethylenediamine,
N,N'-dimethylethylenediamine,
3-(dimethylamino)propylamine,
N,N',N''-trimethyldiethylenetriamine,
2,2'-bipyridine,
N-(2-hydroxypropyl)ethylenediamine,
N,N,N',N'-tetrakis-(2-hydroxypropyl)ethylenediamine,
N-(2-aminoethyl)piperazine,
N-methyl piperazine,
1,4-bis(2-hydroxypropyl)-2-methyl piperazine,
N,N,N',N'-tetramethyl-1,4-butanediamine and
N,N',N''-triethyl diethylenetriamine.

The catalysts useful in the process of this invention are conveniently formed by reacting at least one of the polyamine or aminoether additives with a metal halide and organometallo compound of a conventional Ziegler-type catalyst system in an inert solvent. Thus, by way of illustration, the additive can be added to titanium or vanadium trichloride prior to the addition of the organometallic compound, or the catalyst components can be added to an inert solvent present with the ethylene to be polymerized. Furthermore, two or more additives can be used if desired.

In general, up to about 0.75 mole of additive per mole of organometallic compound is effective in increasing the polymerization rate and/or density of the polyethylene. However, about 0.05 to about 0.5 mole of additive for each mole of organometallic compound is advisably used.

In the preparation of the active catalyst of this invention by combining the catalyst component in an inert solvent, a chemical reaction occurs, usually evidenced by a color change or formation of a black precipitate. With many of the catalyst combinations, the chemical reaction occurs at moderately elevated temperatures, such as about 60°–80° C., although with some additives higher temperatures up to about 100° C. can be used. With other additives lower temperatures are sufficient to initiate the catalyst forming reaction. However, other variables such as concentration of the catalyst components in the inert solvent, time of contact and presence or absence of ethylene will also affect the temperature at which the reaction occurs. This reaction, which results in the production of the improved catalyst, does not occur in the absence of the additive component of this invention.

The modified catalyst is conveniently prepared by first reacting the metal halide with the additive in an inert solvent, and advisably in an inert atmosphere, adding the organo-metallic component to the resulting slurry and then allowing it to react. The ethylene can then be added to the catalyst slurry at polymerization temperature or the catalyst slurry can be transferred to a polymerization reactor. Alternatively, the ethylene can be present during the formation of the catalyst.

The most active catalysts are those prepared from the metal halides having a valance of 3 or less, such as titanium trichloride and vanadium trichloride. The most useful catalysts for polymerizing ethylene appear to be those prepared from an alkylaluminum, an additive and a vanadium or titanium halide and particularly the trichlorides.

In the preparation of the improved catalyst with most additives, heating the catalyst system to the neighborhood of 100° C. and in the absence of ethylene partially or completely deactivates the catalyst. Thus, an additive, such as a monoamine, which requires heating under these conditions to cause the desired reaction between the catalyst components gives an inactive catalyst. This effect does not necessarily prevent polymerization at such temperatures, however, since in the presence of ethylene the catalyst is apparently stabilized.

The polymerization of ethylene employing the catalyst of this invention is readily effected using the same solvents as discussed above for the polymerization using the conventional Ziegler-type catalysts.

The polymerization reaction can be effected from room temperature to 105° C. or higher with the process preferably being effected at 60° C. to 85° C. It is important to note, however, that the additive modified catalyst may be preformed or activated at temperatures higher or lower than those used in the ethylene polymerization itself. Temperatures of catalyst formation higher than used in the polymerization may be necessary for activation, while catalyst formation at lower temperatures than used in the polymerization may be needed to avoid thermal instability of the catalyst in the absence of ethylene.

Polymerization may be effected at any convenient pressure. Atmospheric pressure or slightly higher such as 30 p.s.i.g. is particularly suitable although higher pressures can be used, but are not needed.

At completion of the polymerization reaction, the polymer slurry is filtered to isolate the resinous polyethylene. The solid product so obtained is then freed of catalyst residues by any of several known techniques. One method is to stir a slurry of the polyethylene in an alcohol such as methanol and then remove the insoluble resinous polyethylene by filtration to give a friable white product.

The polymerization can be adapted readily to a continuous process under the proper conditions.

When a dialkylaluminumhydride is used as the organometallic component of the catalyst it may be conveniently prepared by heating the corresponding trialkylaluminum compound in an inert solvent such as n-decane at an elevated temperature such as about 125 to 170° C. However, the mode of preparation appears to result in no significant difference in activity of the hydride.

The following examples illustrate the invention.

*Example 1*

The polymerization of ethylene was accomplished using diisobutylaluminum hydride solutions prepared in various ways.

Batch A was prepared by refluxing a mixture of one part by volume of 25% triisobutylaluminum in isooctane and 1–1.5 parts by volume of n-decane for about 2–4 hours at 136–148° C.

Batch B was prepared by heating a solution of 100 ml. of 25% triisobutylaluminum in isooctane and 150 ml. of n-decane under a stream of nitrogen until 100 ml. of liquid had distilled off. During this time (2 hours) the pot temperature gradually increased to 171° C. and the head temperature from 100° C. to 153° C. When the pot temperature reached about 165° C., a gray precipitate of aluminum began to form. During the twenty minutes of distillation after the first appearance of the precipitate the deposit became quite heavy. The precipitate was suspended in the liquid and included in the catalyst.

Ethylene polymerization runs were made using 20 ml. of the diisobutylaluminum hydride solutions prepared as above and 0.5 g. of $TiCl_3$ (5 ml. of a 10% slurry in isooctane). In the runs in which an additive was used, it was added as 10 ml. of a 0.1 molar solution of the additive in isooctane, corresponding to a 0.11 molar ratio of additive to aluminum compound; however, in some runs, as noted on Table I, one-half the amount of additive was used.

Polymerization was effected by charging the catalyst and additive, when used, into a 350 ml. jacketed bottle on a hydrogenation shaker. Ethylene from a reservoir at 75 p.s.i.g. was fed into the bottle at a rate to maintain a constant pressure of 30 p.s.i.g. The polymerization was effected at 75° C. except for one run at 85° C. The amount of ethylene gas taken up was recorded. To determine the polymerization rate the pressure drop in the reservoir was converted to grams of ethylene consumed and then plotted against time. The slope of the curve was taken as the polymerization rate in grams per hour.

The polymerization was terminated, the bottle cooled and the contents filtered through a cloth filter with suction. The solid, insoluble product obtained by filtration was stirred with several portions of methanol in a Waring Blendor until the solid and supernatant liquids were colorless. The solid was then dried to give a friable white product.

The measure of molecular weight was the logarithmic viscosity number (LVN) measured in tetralin at 135° C. (See Billmeyer, Textbook of Polymer Chemistry, Interscience Publishers, Inc., page 128 (1957)).

The results of the polymerization experiments are shown in Table I.

TABLE I.—EFFECT OF VARIOUS ADDITIVES ON ETHYLENE POLYMERIZATION

| Run No. | Additive | Alkyl aluminum component | Reaction rate | Density | LVN |
|---|---|---|---|---|---|
| 126 | None | A | 10 | .946 | Insol. |
| 109 | N,N,N',N'-tetramethyl methylenediamine. | A | 60 | .969 | 2.04 |
| 110 | ___do___ | A | 60 | .971 | 1.94 |
| 120 | ___do___ | A | 47 | .963 | 2.56 |
| 132 | ___do___ | B | 66 | .975 | 1.62 |
| 134 | ___do___ | B | 66 | .975 | 1.15 |
| 137 | ___do___ | A | 60 | .968 | 1.94 |
| 140 | ___do ᵃ___ | A | 40 | .969 | 1.78 |
| 145 | ___do___ | A | 64 | .973 | 1.84 |
| 147 | ___do___ | A | 55 | .961 | 2.55 |
| 138 | Bis(ethoxyethyl)amine.ᵇ | A | 66 | .972 | 1.26 |
| 139 | ___do ᵇ___ | A | 62 | .974 | 1.45 |
| 146 | 2-Ethoxyethylamine. | A | 26 | .959 | 3.00 |
| 148 | ___do___ | A | 29 | .961 | 2.99 |
| 143 | N,N,N',N'-tetramethylethylenediamine. | A | 32 | .963 | 2.48 |
| 144 | ___do ᵇ___ | A | 28 | .964 | 2.54 |
| 150 | Diethylaminomethyl methyl ether. | A | 16 | .959 | Insol. |
| 151 | N,N,N',N'-tetramethyl 1,3-propane-diamine. | A | 55 | .969 | 2.13 |

ᵃ Run at 85° C. rather than 75° C.
ᵇ 5 ml. of additive solution used.

*Example 2*

Additional runs were made using the additives of this invention and untreated triisobutylaluminum in the catalyst system. All runs utilized 5 ml. of a 10% slurry of $TiCl_3$ in isooctane and 10 ml. of a 25% triisobutylaluminum isooctane solution. The additive was added in 10 ml. of isooctane to give an additive to aluminum ratio of 0.11 except for two runs which used half the usual amount of additive solution. The $TiCl_3$ was milled 4 hours in the presence of the additive before the addition of the alkylaluminum compound. Runs were made at 75° C. using the apparatus described in Example 1. The results are reported in Table II.

TABLE II.—EFFECT OF ADDITIVES ON ETHYLENE POLYMERIZATION

| Run No. | Additive | Rate, g./hr. | Density | LVN |
|---|---|---|---|---|
| 25 | None | 20 | .935 | 5.97 |
| 27 | ___do___ | 26 | .9416 | 8.70 |
| 95 | N,N,N',N'-tetramethylmethylenediamine. | 45 | .9500 | Insol. |
| 105 | ___do___ | 43 | .9508 | Insol. |
| 118 | ___do___ | 48 | .9480 | Insol. |
| 106 | N,N,N',N'-tetramethylethylenediamine. | 32 | .9563 | 3.02 |
| 108 | Diethylaminomethyl methyl ether. | 12.7 | .9542 | Insol. |
| 113 | 2-ethoxyethylamine | 12.9 | .9489 | |
| 123 | Bis(ethoxyethyl)amine | 31 | .954 | 4.38 |
| 122 | ___do ᵃ___ | 42 | .959 | 3.52 |
| 124 | ___do ᵃ___ | 55 | .960 | 2.65 |

ᵃ 5 ml. of additive solution used.

*Example 3*

The effect of temperature on ethylene polymerization was investigated with and without the presence of N,N,N',N'-tetramethylmethylenediamine as an additive. Each run employed 5 ml. of a 10% slurry of $TiCl_3$ in isooctane and 10 ml. of a 25% triisobutylaluminum isooctane solution. 10 ml. of a 0.1 molar isooctane solution of the additive was used where applicable. The $TiCl_3$ was milled 4 hours in the presence of the additive. The apparatus and procedure were as in Example 1. The results obtained are tabulated in Table III.

The example illustrates the effect of temperature on the rate of formation of the modified catalyst in the presence of ethylene.

TABLE III

| Run No. | Temp., ° C. | Additive | Rate, gm./hr. | Density |
|---|---|---|---|---|
| 33 | 25 | None | 8.4 | 0.936 |
| 35 | 25 | ___do___ | 9.6 | 0.937 |
| 37 | 50 | ___do___ | 22.8 | 0.940 |
| 39 | 50 | ___do___ | 13.0 | 0.941 |
| 41 | 65 | ___do___ | 25.2 | 0.941 |
| 25 | 75 | ___do___ | 20.0 | 0.935 |
| 27 | 75 | ___do___ | 26.0 | 0.942 |
| 43 | 85 | ___do___ | 11.4 | 0.948 |
| 45 | 85 | ___do___ | 27.6 | 0.947 |
| 47 | 85 | ___do___ | 17.4 | 0.942 |
| 91 | 95 | ___do___ | 11.0 | 0.9459 |
| 94 | 95 | ___do___ | 15.0 | 0.9464 |
| 34 | 25 | N,N,N',N'-tetramethylmethylenediamine. | 5.8 | 0.936 |
| 36 | 25 | ___do___ | 4.0 | 0.936 |
| 38 | 50 | ___do___ | 11.0 | 0.935 |
| 40 | 50 | ___do___ | 5.6 | 0.939 |
| 42 | 65 | ___do___ | 34.8 | 0.948 |
| 50 | 65 | ___do___ | 55.0 | 0.952 |
| 26 | 75 | ___do___ | 35.0 | 0.949 |
| 28 | 75 | ___do___ | 41.0 | 0.961 |
| 95 | 75 | ___do___ | 45.9 | 0.950 |
| 46 | 85 | ___do___ | 30.0 | 0.954 |
| 48 | 85 | ___do___ | 54.0 | 0.962 |
| 92 | 95 | ___do___ | 23.0 | 0.9625 |
| 93 | 95 | ___do___ | 26.0 | 0.9587 |
| 96 | 95 | ___do___ | 20.4 | 0.9595 |
| 90 | 105 | ___do___ | 1.5 | 0.9533 |

*Example 4*

The effect of various conditions on the heat treatment of triisobutylaluminum to form the hydride was studied.

Preparation A was made by adding 150 ml. of decane to a 300 ml. round bottom flask, adding 100 ml. of a 25% solution of triisobutylaluminum in isooctane and heating at 169° C. until 100 ml. of distillate was collected.

Preparation B was made by heating a 25% solution of triisobutylaluminum in decane on an oil bath until one mole equivalent of isobutylene was recovered.

Preparation C was prepared as Preparation B except that heating was stopped after 0.5 mole equivalent of isobutylene was recovered.

All runs utilized 5 ml. of a 10% slurry of $TiCl_3$ in isooctane and were run at 75° C. and 30 p.s.i. Ten ml. of 0.1 molar solutions of N,N,N',N'-tetramethylmethylenediamine, and N,N,N',N'-tetramethylpropanediamine, and 5 ml. of 0.1 molar solution of bis-(ethoxyethyl)amine, in isooctane were used. The results are given in Table IV.

The results show no significant differences in activity of the catalysts arising from these different alkyl aluminum preparations were found. All gave very rapid polymerization rates and products of high density. Using different amounts of hydride-modified alkyl aluminum appears to have little effect on the polymerization.

As is shown in Table IV, the polymer obtained by these runs had a very low methyl content indicating a highly linear polymer.

*Example 5*

Additional runs were made, some with different additives. In these runs 0.5 gm. of titanium trichloride was weighed into a 385 ml. reactor bottle in a dry box and covered with 10 ml. of n-heptane. The bottle was stoppered, taken out of the dry box and filled with heptane to bring the total volume of heptane to 185 ml. The reactor bottle was fastened into a heating jacket on a modified Parr shaker and 5 ml. of a 0.1 molar solution of the additive added followed by 10 ml. of a 0.9 molar solution of diisobutylaluminum hydride in decane. The reactor was heated and agitated and when it reached 75° C., the reactor was pressurized to 30 p.s.i.g. with ethylene. Polymerization was then effected as in Example 1 and the product isolated as indicated there. The results obtained are reported in Table V.

TABLE IV.—POLYMERIZATION OF ETHYLENE WITH HYDRIDE CATALYSTS

| Run No. | Additive | Alkyl aluminum component | Alkyl aluminum component amount, ml. | Reaction rate, g./hr. | Density | LVN | Methyl content [a] CH$^3$ groups, 1000 C atoms |
|---|---|---|---|---|---|---|---|
| 169 | N,N,N',N'-tetramethylmethyl-enediamine. | B | 10 | 50 | .971 | 2.09 | 0.29 |
| 167 | ....do.... | C | 10 | 75 | .965 | 2.25 | .27 |
| 170 | ....do.... | C | 10 | 57 | .959 | 3.13 | .22 |
| 173 | ....do.... | C | 10 | 60 | .969 | 2.45 | .27 |
| 166 | ....do.... | B | 20 | 60 | .978 | 1.64 | .81 |
| 162 | ....do.... | A | 20 | 55 | .967 | 2.27 | .57 |
| 168 | ....do.... | C | 20 | 82 | .971 | 2.01 | .45 |
| 171 | Bis(2-ethoxyethyl)amine | B | 10 | 75 | .975 | 1.20 | 1.65 |
| 172 | ....do.... | C | 10 | 75 | .971 | 1.73 | .78 |
| 174 | ....do.... | C | 10 | 60 | .971 | 1.63 | ......... |
| 166 | ....do.... | A | 20 | 60 | .978 | 1.15 | 1.77 |
| 164 | ....do.... | A | 20 | 54 | .971 | 1.45 | .95 |
| 161 | N,N,N',N'-tetramethyl-1,3-propanediamine. | A | 20 | 53 | .977 | 1.82 | .96 |
| 160 | ....do.... | A | 20 | 60 | .971 | 1.98 | .66 |

[a] By infrared analysis by procedure of Willbourn, J. Poly. Sc. 34, 569 (1959).

TABLE V

| Run No. | Additive | Rate, g./hr. | LVN | CH$_3$/1,000 | Density |
|---|---|---|---|---|---|
| 318 | None | 5.6 | Insol. | Trace | 0.939 |
| 320 | ....do.... | 5.3 | 7.86 | Trace | 0.939 |
| 421A | N,N'-dimethyl ethylenediamine | 5.33 | Insol. | Trace | 0.947 |
| 421B | ....do.... | 7.50 | Insol. | Nil | 0.948 |
| 425A | Tetramethyl 1,3-butanediamine | 20.4 | Insol. | 0.19 | 0.954 |
| 425B | ....do.... | 26.6 | Insol. | Trace | 0.959 |
| 426A | Bis (dimethylamino) propanol-2 | 48.0 | 3.60 | 0.25 | 0.953 |
| 426B | ....do.... | 29.3 | 2.33 | 0.49 | 0.962 |
| 427A | N,N,N',N'-tetramethyl 1,3-propanediamine. | 32.8 | Insol. | 0.19 | 0.957 |
| 427B | ....do.... | 50.5 | Insol. | Trace | 0.956 |
| 429B | Diphenylethylenediamine | 8.00 | Insol. | Trace | 0.955 |
| 432A | Dimethylamino propylamine | 5.46 | Insol. | 0.33 | 0.959 |
| 432B | ....do.... | 6.18 | Insol. | 0.10 | 0.955 |
| 435B | N,N-diethyl ethylenediamine | 6.64 | Insol. | 0.31 | 0.959 |
| 436A | Trimethyl ethylenediamine | 22.6 | Insol. | 0.43 | 0.959 |
| 436B | ....do.... | 15.7 | Insol. | Trace | 0.957 |
| 437A | Benzyl dimethyl ethylenediamine | 6.0 | Insol. | 0.25 | 0.960 |
| 437B | ....do.... | 7.3 | Insol. | 0.38 | 0.958 |
| 438A | N,N,N',N'-tetramethyl 1,4-butanediamine. | 7.6 | Insol. | Trace | 0.954 |
| 438B | ....do.... | 7.3 | Insol. | Trace | 0.952 |
| 441 | N,N,N',N'-tetramethyl ethylenediamine | 24.2 | Insol. | 0.96 | 0.963 |
| 442 | ....do.... | 26.5 | Insol. | 0.65 | 0.964 |

*Example 6*

Additional polymerization runs were made using the catalyst ingredients and amounts of Example 5 except that the additives of Table VI were used. The procedure of that in Example 5 was followed in all other respects. The results obtained are shown in Table VI.

TABLE VI

| Run No. | Additive | Rate, g./hr. | LVN | CH$_3$/1,000 | Density |
|---|---|---|---|---|---|
| 445 | N,N-diethylaminoethyl methyl ether. | 8.4 | Insol. | Trace | 0.942 |
| 446 | ....do.... | 10.4 | Insol. | Nil | 0.9519 |
| 451 | N,N'-dibenzyl ethylenediamine | 10.0 | Insol. | Trace | 0.9566 |
| 452 | ....do.... | 8.0 | Insol. | 0.10 | 0.9579 |
| 455 | Bis(ethoxyethyl)amine | 61.5 | 1.164 | 0.84 | 0.9723 |
| 456 | ....do.... | 62.5 | 1.160 | 0.30 | 0.9724 |
| 461 | N,N',N''-triethyl diethylenetriamine. | 20.4 | 1.718 | 0.61 | 0.9711 |
| 462 | ....do.... | 20.8 | Insol. | 0.48 | 0.9665 |
| 463 | N-ethyl morpholine | 9.5 | Insol. | Trace | 0.9512 |
| 464 | ....do.... | 8.8 | Insol. | 0.10 | 0.9501 |
| 465 | N,N',N''-trimethyl diethylenetriamine. | 6.8 | Insol. | 0.10 | 0.9621 |
| 466 | ....do.... | 6.9 | Insol. | 0.28 | 0.9521 |
| 469 | 2,2'-bipyridine | 9.3 | Insol. | Trace | 0.9559 |
| 470 | ....do.... | 9.3 | Insol. | Nil | 0.9551 |
| 471 | N-(2-hydroxypropyl)ethylenediamine. | 7.2 | Insol. | 0.13 | 0.9641 |
| 472 | ....do.... | 7.2 | Insol. | 0.09 | 0.9625 |
| 473 | N,N,N',N'-tetrakis(2-hydroxypropyl)-ethylenediamine. | 10.6 | Insol. | 0.21 | 0.9690 |
| 474 | ....do.... | 7.4 | Insol. | 0.44 | 0.9677 |
| 475 | N-(2-aminoethyl)-piperazine | 8.3 | Insol. | 0.36 | 0.9629 |
| 476 | ....do.... | 8.8 | Insol. | 0.13 | 0.9641 |
| 489 | 1,4-Bis(2-hydroxypropyl) 2-methyl-piperazine. | 10.6 | Insol. | 0.09 | 0.9594 |
| 490 | ....do.... | 8.9 | Insol. | 0.15 | 0.9600 |
| 491 | See footnote 1 | 64.0 | Insol. | 0.27 | 0.9728 |
| 492 | ....do.... | 55.0 | 1.875 | 0.60 | 0.9705 |
| 318 | None | 5.6 | Insol. | Trace | 0.939 |
| 320 | ....do.... | 5.3 | 7.86 | Trace | 0.939 |

[1] 2.5 ml. of a 0.1 molar solution of bis(ethoxyethyl)amine and 5 ml. of a 0.1 molar solution of N-(2-aminoethyl)piperazine, both in decane, were used as an additive mixture in the usual way.

Example 7

The procedure of Example 5 was followed using vanadium trichloride in place of titanium trichloride, with the additives shown in Table VII. The results are given in the said table.

TABLE VII

| Run No. | Additive | Rate, g./hr. | LVN | CH₃/1,000 | Density |
|---|---|---|---|---|---|
| 652 | N, N′, N″-triethyl diethylene triamine | 50.5 | | 1.39 | 0.9710 |
| 625 | Bis(ethoxyethyl)amine | 175.0 | 0.873 | 2.23 | 0.9734 |
| 624 | None | 14.0 | 5.850 | 0.50 | 0.9484 |

Run No. 652 used triisobutyl aluminum and Runs 625 and 624 used diisobutyl aluminum hydride.

Example 8

The following experiment was to determine the effect of the chemical reaction between the catalyst components as evidenced by the formation of a black precipitate. The catalyst was prepared by adding 0.5 gram of titanium trichloride to a 385 ml. reactor bottle in a dry box and then covering the TiCl₃ with 10 ml. of n-heptane. The bottle was stoppered, taken out of the dry box and filled with heptane to bring the total volume of heptane to 185 ml. The reactor bottle was fastened into a heating jacket on a modified Parr shaker and 5 ml. of a 0.1 molar solution of the additive added, followed by 10 ml. of a 0.9 molar solution of diisobutylaluminum hydride in n-decane. The catalyst components were agitated and heated to an elevated temperature necessary to produce a black precipitate. In some cases, where no additive was present or a monoamine was used as the additive, the black precipitate did not form, even at temperatures approaching 100° C.

The catalyst slurry was transferred to a polymerization reactor, heated to 75° C., and the reactor pressurized to 30 p.s.i.g. with ethylene. Polymerization was then effected as in Example 1 and the product isolated as indicated therein. The results obtained are presented in Table VIII.

TABLE VIII

| Run No. | Additive | Temperature to form black precipitate, °C. | Rate, g./hr. |
|---|---|---|---|
| 747 | N,N,N′,N′-tetramethyl 1,3-propanediamine | 78 | 82 |
| 750 | N,N,N′,N′-tetramethyl 1,4-butanediamine | 78 | 89 |
| 753 | N-methylpiperazine | 90 | 58 |
| 755 | Triethylamine | *90 | 20 |
| 756 | N,N-dimethylaniline | *90 | 20 |
| 573 | Bis(2-ethoxyethyl)amine | 78 | 150 |
| 581 | None | *95 | 29 |
| 583 | do | *95 | 9 |

*Black precipitate did not form.

Various changes and modifications of the invention can be made and, to the extent that such variations incorporate the spirit of this invention, they are intended to be included within the scope of the appended claims.

What is claimed is:

1. The process of polymerizing ethylene which comprises effecting the polymerization with a catalyst comprising the reaction product of a trialkylaluminum, titanium trichloride and a polyamine.

2. The process of polymerizing ethylene which comprises effecting the polymerization with a catalyst comprising the reaction product of a trialkylaluminum, titanium trichloride and an aminoether.

3. The process of polymerizing ethylene which comprises effecting the polymerization with a catalyst comprising the reaction product of a dialkylaluminum hydride, titanium trichloride and a polyamine.

4. The process of polymerizing ethylene which comprises effecting the polymerization with a catalyst comprising the reaction product of a dialkylaluminum hydride, titanium trichloride and an aminoether.

5. The process of polymerizing ethylene which comprises effecting the polymerization with a catalyst comprising the reaction product of a trialkylaluminum, vanadium trichloride and a polyamine.

6. The process of polymerizing ethylene which comprises effecting the polymerization with a catalyst comprising the reaction product of a trialkylaluminum, vanadium trichloride and an aminoether.

7. The process of polymerizing ethylene which comprises effecting the polymerization with a catalyst comprising the reaction product of a dialkylaluminum hydride, vanadium trichloride and a polyamine.

8. The process of polymerizing ethylene which comprises effecting the polymerization with a catalyst comprising the reaction product of a dialkylaluminum hydride, vanadium trichloride and an aminoether.

9. The process of polymerizing ethylene which comprises effecting the polymerization with a polymerization catalyst comprising the reaction product of a member of the group consisting of trialkylaluminum and dialkylaluminum hydride, a member of the group consisting of titanium trichloride and vanadium trichloride and a member of the group consisting of polyamines and aminoethers.

10. The process of claim 9 in which the polymerization is effected at about 60° C. to about 105° C.

11. The process of polymerizing ethylene which comprises effecting the polymerization with a polymerization catalyst combination comprising (a) an organometallic compound in which the metal therein is selected from a member of the group consisting of Groups IIA, IIB and IIIA of the Periodic Table, (b) a metal halide in which the metal therein is selected from a member of the group consisting of Groups IVB, VB and VIB of the Periodic Table, and (c) a member of the group consisting of polyamines and aminoethers.

12. The process according to claim 11 in which 0.05 to 0.75 moles of a member of the group consisting of polyamines and aminoethers is used per mole of organometallic compound.

13. The process of polymerizing ethylene which comprises effecting the polymerization with a catalyst combination comprising a trialkylaluminum, a titanium halide and an aminoether.

14. The process of claim 2 in which the aminoether is bis-(2-ethoxyethyl) amine.

15. The process of polymerizing ethylene which comprises effecting the polymerization with a catalyst combination comprising a trialkylaluminum, a titanium halide and a polyamine.

16. The process of claim 15 in which the polyamine is N,N,N′,N′-tetramethyl-1,3-propanediamine.

17. The process of claim 15 in which the polyamine is N,N,N′,N′-tetramethylmethylenediamine.

18. The process of claim 15 in which the polyamine is N,N,N′,N′-tetramethylethylenediamine.

19. The process of claim 11 in which the polyamine chelates metals.

20. The process of claim 11 in which the aminoether chelates metals.

21. The process of claim 11 in which the polymerization is effected from about room temperature to about 105° C.

22. The process of claim 11 in which the polymerization is effected at about 60° C. to 85° C.

References Cited by the Examiner

UNITED STATES PATENTS

| | | | |
|---|---|---|---|
| 2,905,645 | 9/1959 | Anderson et al. | 260—94.9 |
| 2,932,633 | 4/1960 | Juveland et al. | 260—94.9 |

FOREIGN PATENTS

| | | |
|---|---|---|
| 554,242 | 5/1957 | Belgium. |
| 809,717 | 3/1959 | Great Britain. |
| 820,773 | 9/1959 | Great Britain. |

JOSEPH L. SCHOFER, *Primary Examiner.*

LESLIE H. GASTON, JOSEPH R. LIBERMAN,
*Examiners.*